United States Patent [19]

Matsumura et al.

[11] Patent Number: 5,895,588
[45] Date of Patent: Apr. 20, 1999

[54] CONTROLLER OF LASER MARKING MACHINE

[75] Inventors: Yukinori Matsumura, Isehara; Koji Misugi, Ninomiya-machi; Akihiko Soda, Hiratsuka, all of Japan

[73] Assignee: Komatsu Ltd., Tokyo, Japan

[21] Appl. No.: 08/894,862

[22] PCT Filed: Mar. 7, 1996

[86] PCT No.: PCT/JP96/00555

§ 371 Date: Sep. 3, 1997

§ 102(e) Date: Sep. 3, 1997

[87] PCT Pub. No.: WO96/27474

PCT Pub. Date: Dec. 9, 1996

[30] Foreign Application Priority Data

Mar. 7, 1995 [JP] Japan ................... 7-047381

[51] Int. Cl.⁶ .................................................. B23K 26/06
[52] U.S. Cl. ................... 219/121.68; 219/121.73
[58] Field of Search ............ 219/121.68, 121.69, 219/121.73, 121.8, 121.85, 121.74, 121.82; 359/196, 202; 347/260, 261; 349/2, 4

[56] References Cited

U.S. PATENT DOCUMENTS

| | | | |
|---|---|---|---|
| 5,309,273 | 5/1994 | Mori et al. | 359/202 |
| 5,587,094 | 12/1996 | Yoshida et al. | 219/121.68 |
| 5,605,641 | 2/1997 | Chiba et al. | 219/121.68 |
| 5,608,563 | 3/1997 | Matsumura et al. | 359/202 |
| 5,663,826 | 9/1997 | Tsuda et al. | 359/202 |
| 5,703,709 | 12/1997 | Mori et al. | 359/196 |
| 5,726,673 | 3/1998 | Tsuda et al. | 345/87 |
| 5,734,145 | 3/1998 | Ichihara et al. | 219/121.69 |

FOREIGN PATENT DOCUMENTS

| | | | |
|---|---|---|---|
| 692335 | 1/1996 | European Pat. Off. . | |
| 2-268988 | 11/1990 | Japan | 219/121.68 |
| 3-208678 | 9/1991 | Japan | 219/121.68 |
| 5-200570 | 8/1993 | Japan | 219/121.69 |
| 5-313085 | 11/1993 | Japan . | |
| 6-262376 | 9/1994 | Japan | 219/121.68 |
| 7-214350 | 8/1995 | Japan . | |
| 2290495 | 1/1996 | United Kingdom | 219/121.69 |
| WO9521718 | 8/1995 | WIPO . | |

OTHER PUBLICATIONS

International Search Report in PCT/JP95/00555 mailed May 28, 1996.

*Primary Examiner*—Gregory L. Mills
*Attorney, Agent, or Firm*—Varndell Legal Group

[57] ABSTRACT

A controller for controlling a laser marking machine, which classifies a divided image into a non-printing region (H row) and a printing region ("APPER"). When the non-printing region is displayed on a liquid crystal display screen, the printing pattern ("APPER") is displayed on the liquid crystal screen so that scanning on the liquid crystal display screen is started by a scanning device from the printing region continuing the non-printing region by omitting this non-printing region (H row) when it is in an upper region for which scanning is first made. A moving device corrects the moving distance of the printing position of the printing pattern by the distance corresponding to the non-printing region (H row) so omitted, and starts movement to the marking position of the next divided image (B'3) when scanning of the printing region of this divided image (B'2) is finished. According to this construction, the reduction of the marking time and the restriction of the occurrence of non-uniform printing can be simultaneously accomplished.

3 Claims, 10 Drawing Sheets

CONTROLLER OF LASER MARKING MACHINE

TECHNICAL FIELD

The present invention relates to a controller of a laser marking machine.

BACKGROUND ART

In a laser marking machine, it is arranged that a printing pattern of a divided image is displayed on a liquid crystal display screen (in which a transparent scattering type liquid crystal is employed) which serves as a liquid crystal mask; a laser beam is then scanned over the liquid crystal display screen and a printing position is moved so that the printing pattern of the divided image displayed on the liquid crystal display screen is printed at a position corresponding to this divided image on an article on which the printing pattern is to be printed.

In order to shorten the marking time and improve the efficiency of the operation, what is called "white space skipping" control is performed such that, of the printing pattern on the liquid crystal screen, only printing portions are scanned, non-printing portions being skipped without scanning.

By means of such "white space skipping" control, the benefit is obtained that the area of the scanning field can be reduced so the marking time can be shortened to an extent corresponding to the unscanned area of the field.

However, portions which are irradiated by the laser beam and portions which are not irradiated by the laser beam are interspersed, creating temperature differences within the plane of the liquid crystal mask.

The relationship between the transmittance of the liquid crystal and the drive voltage depends on temperature. If the drive voltage is fixed, the transmittance of portions of higher temperature increases. The drive voltage is in fact constant in the plane of the liquid crystal mask.

Temperature irregularities in the plane of the liquid crystal mask therefore appear as marking irregularities, adversely affecting the quality of the marking.

Thus, if "white space skipping" control is performed, a temperature distribution is created within the liquid crystal mask plane, producing unevenness of marking. Also, if "white space skipping" control is not performed, although unevenness of marking is suppressed, there is no way to shorten the marking time.

With the foregoing in view, it is an object of the present invention to achieve simultaneously both shortening of the marking time and suppression of irregularities in marking.

DISCLOSURE OF THE INVENTION

As mentioned above, it is an object of the present invention to achieve simultaneously both shortening of the marking time and suppression of irregularities in marking.

This object is achieved by the first aspect of the invention and second aspect of the invention as follows.

Specifically, the first aspect of this invention consists in a laser marking machine comprising: display means for dividing a printing pattern of an original image to be printed onto an article into divided-image printing patterns and displaying the divided-image printing patterns on a liquid crystal display screen; scanning means for effecting scanning of a laser beam generated by a laser light source over the liquid crystal display screen; and moving means for moving the printing position in such a manner that the printing pattern of the divided image displayed on the liquid crystal display screen is printed at a position on the article to be printed corresponding to the divided image in question, characterized in that the display means displays the printing pattern of the divided image on the liquid crystal display screen such that the divided image is classified into a non-printing region and a printing region, and, if a non-printing region is in an upper region that is scanned first when the liquid crystal display screen is displayed, this non-printing region is omitted and scanning is commenced by the scanning means on the liquid crystal display screen from a printing region following this non-printing region; and the moving means corrects movement amount of the printing position of the printing pattern by an amount of the non-printing region that was omitted and starts movement to a marking position of a next divided image at a time-point where scanning of the printing portion region of the divided image in question has been completed.

Figure 11:
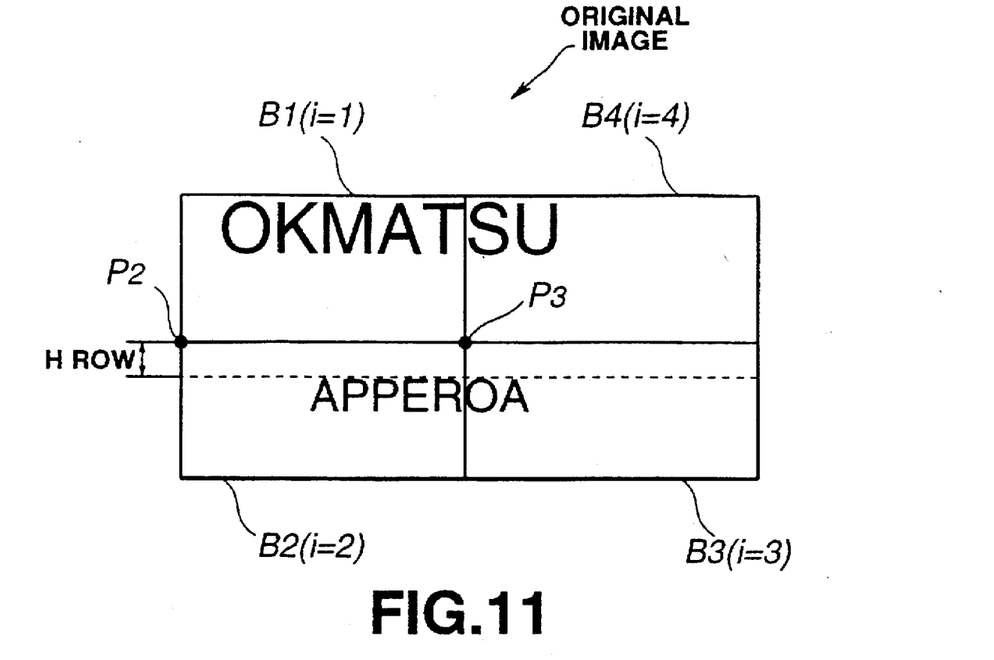
FIG. 11 is a view showing the original image of the marking pattern of an embodiment.
Figure 12A:
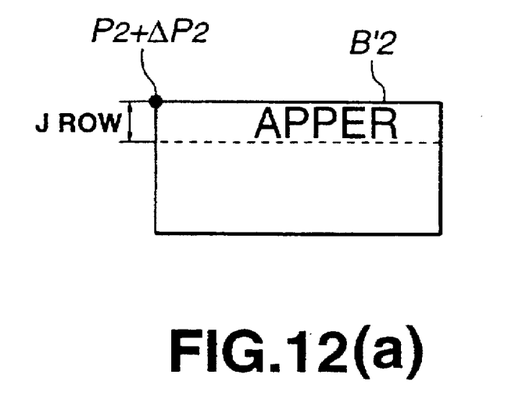
FIG. 12(a) and (b) are views showing the divided images of marking patterns of respective embodiments.

With the construction of the first aspect of the present invention, as shown in FIG. 11, divided image B2 is classified into a non-printing region (H row) and a printing region "APPER" and when display of the liquid crystal display screen is effected if the non-printing region is in the region at the upper region where scanning is first performed, the printing pattern "APPER" of the divided image B'2 is displayed on the liquid crystal display screen such that this non-printing region (H row) is omitted and scanning on the liquid crystal display screen is commenced by the scanning means from the following printing portion (FIG. 12(a)). The moving means then corrects (P2→P2+ΔP2) the movement amount of the printing position of the printing pattern by the amount of the region that was omitted when non-printing (H row) and, at the time-point when scanning of the printing portion region of the divided image in question is completed, starts movement to marking position of the next divided image B'3.

Specifically, since the entire liquid crystal display screen is scanned by the laser beam, a temperature distribution is not produced in the liquid crystal display screen, so marking irregularities can be suppressed; and since movement to the marking position of the next divided image is commenced immediately at the timerpoint when the scanning of the printing portions in the first region in the liquid crystal display screen has been completed, the waiting time of the moving means is eliminated and marking can be performed efficiently.

Also, according to the second aspect of the present invention, in a like laser marking machine, the display means determines whether a size obtained by summing printing regions of a first divided image and a second divided image to be printed continuously is a size that can be contained within the liquid crystal display screen and, if such a determination is made, displays on the liquid crystal display screen a printing pattern obtained by combining the printing pattern of the first divided image and the printing pattern of the second divided image by compressing the non-printing region at a lower side of the printing region of the first divided image and the non-printing region at an upper side of the printing region of the second divided image to a prescribed size; and the moving means commences movement to the marking position of the second divided image from a time-point where scanning of the printing portion region of the first divided image is completed and corrects the movement amount of the printing position of the printing pattern of the second divided image in accordance with an amount of a prescribed size compression of the non-printing region of the first and second divided images.

Figure 10A:
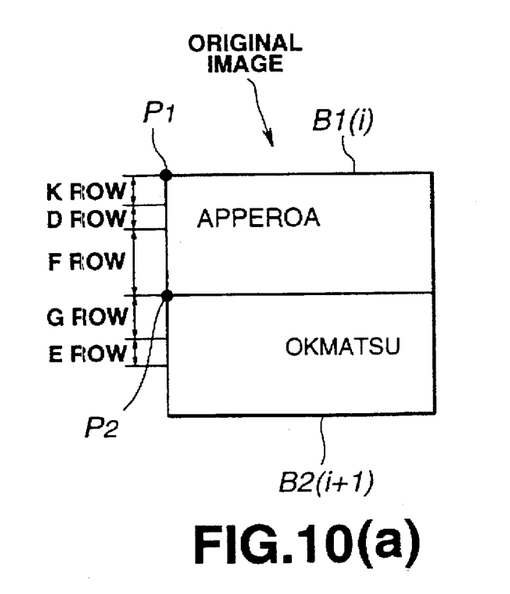
FIG. 10(a) is a view showing the original image of a marking pattern of an embodiment.
Figure 10B:
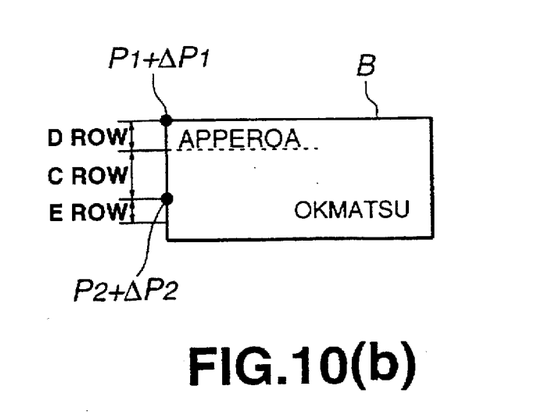
FIG. 10(b) is a view showing a combined image thereof.

With the construction of the second aspect of the present invention, as shown in FIG. 10(a), the display means determines that the size (D row+E row) obtained by summing the printing regions "APPEROA" and "OKMATSU" of the first divided image B1 and the second divided image B2 that are to be continuously printed is a size that can be accommodated within the liquid crystal display screen, and, when this determination is made, compresses the non-printing region (F row) at the lower side of the printing region of first divided image B1 and the non-printing region (G row) at the upper side of the printing region of first divided image B2 to a prescribed size (C row in FIG. 10(b)), with the result that a combined printing pattern consisting of the printing pattern "APPEROA" of the first divided image B1 and of the printing pattern "OKMATSU" of the second divided image B2 is displayed on the liquid crystal display screen.

The moving means then commences movement to the marking position of the second divided image B2 from the time-point where scanning of the printing portion region "APPEROA" of the first divided image B1 was completed and corrects the printing position of the printing pattern "OKMATSU" of the second divided image B2 corresponding to the amount of the compression to the prescribed size (C row) of the non-printing portions (F row and G row) of the first and second divided images B1 and B2 (P2→P2+ ΔP2).

Specifically, since the entire liquid crystal display screen is scanned by the laser beam, a temperature distribution is not produced in the liquid crystal display screen, so marking irregularities can be suppressed.

Also, since marking of two image portions is performed by scanning a single image portion obtained by compression and combination of two divided images into a single divided image, marking time can be very greatly curtailed. And since movement to the marking position of the next divided image is commenced immediately at the time-point when the scanning of the printing portions in the first region in the liquid crystal display screen has been completed, the waiting time of the moving means is eliminated and marking can be performed efficiently.

BRIEF DESCRIPTION OF THE DRAWINGS

FIGS. 6(a) to 6(d) are a timing chart of the marking sequence of an embodiment;

FIGS. 7(a) to 7(d) are a timing chart of the marking sequence of an embodiment;

FIGS. 8(a) to 8(d) are a timing chart of the marking sequence of an embodiment;

BEST MODE FOR CARRYING OUT THE INVENTION

Embodiments of a controller for a laser marking machine according to the present invention are described below with reference to the drawings.

Figure 1:
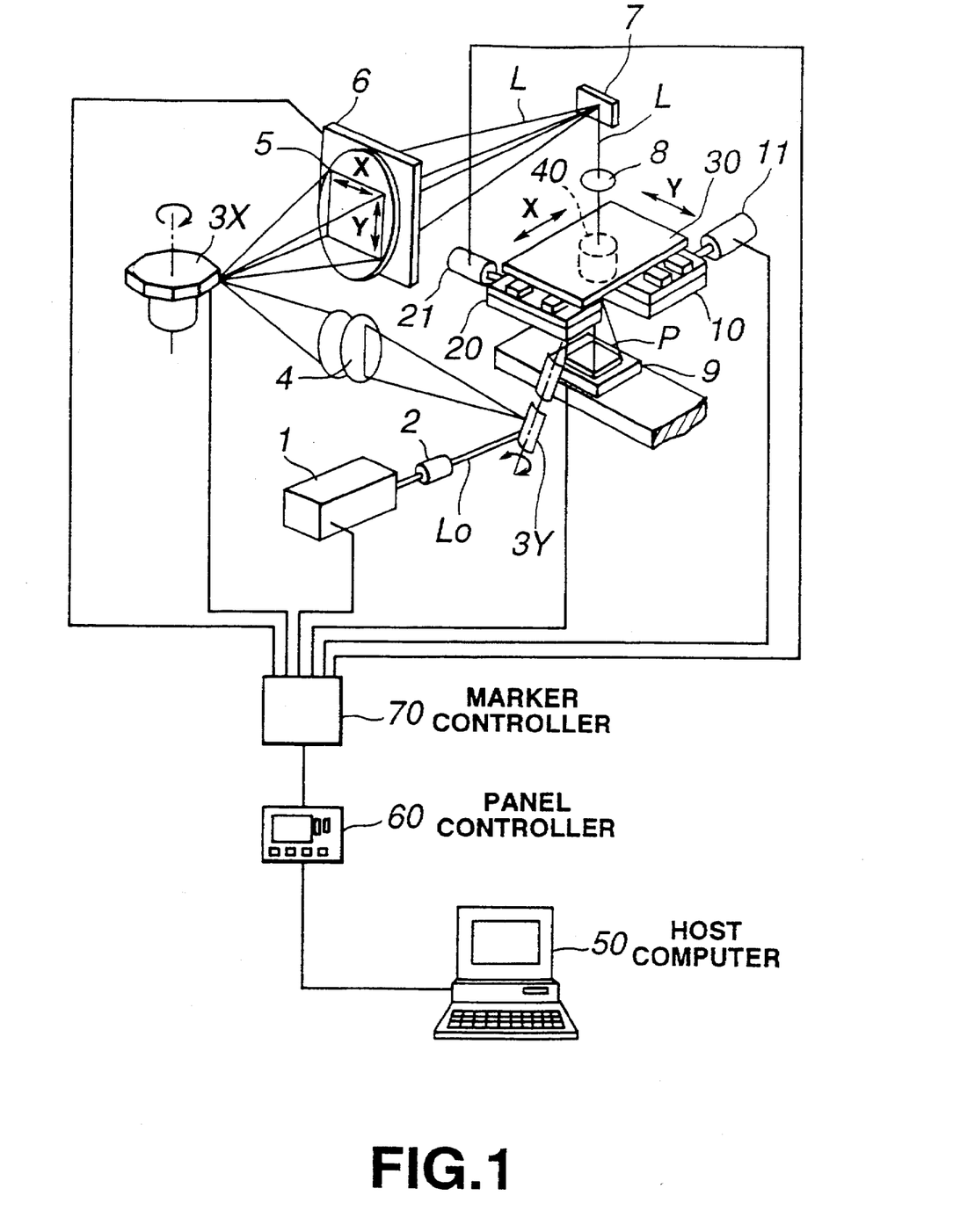
FIG. 1 is a block diagram illustrating the layout of a control unit for laser marking according to the present invention.

FIG. 1 is a perspective view showing the layout of a laser marking machine according to an embodiment. As shown in FIG. 1, this machine comprises: a host computer 50 that inputs data relating to an original image to be printed on a marking surface of a work 9 and that compiles original image data; a panel controller 60 that converts the original image data that is output from this host computer 50 into printing pattern data of a divided image of smaller divisions; a marker controller 70 that sends printing pattern data of the divided image that is output from panel controller 60 to liquid crystal mask 6 and that performs drive control of the drive system of the laser marking machine; and a laser marking machine (optical system and drive system) whereby a laser beam generated by a laser oscillator 1 is conducted to the surface to be marked of work 9.

In the laser marking machine of FIG. 1, marking of a marking pattern displayed on liquid crystal mask 6 is achieved by raster scanning a laser beam L0 over the display screen of liquid crystal mask 6 by means of first XY deflectors (hereinbelow called for convenience "scanning mirrors") 3X, 3Y and deflecting and directing onto work 9 the laser beam L that is transmitted by these, using second XY deflectors (hereinbelow called for convenience "XY tables").

Specifically, the laser beam L0 that is generated by laser oscillator 1, after passing through beam splitter 2, is scanned in the Y direction (vertical direction in the plane of the drawing on liquid crystal mask 6) by galvano-scanner meter 3Y. Laser beam L0 is then reduced in size by relay lens 4, and scanned in the X direction (left-right direction in the plane of the drawing on liquid crystal mask 6) by polygonal mirror 3X. Laser beam L0 is then condensed onto reflecting mirror 7 by lens 5.

Thus raster scanning of laser beam L0 on the screen of liquid crystal mask 6 is performed in response to movement of galvano-scanner meter 3Y and polygonal mirror 3X. The light L that is transmitted from this divided pattern display screen enters the second XY deflector through reflecting mirror 7 and object lens 8.

By means of this second deflector, the printing pattern on the divided screen of liquid crystal mask 6 is deflected and projected onto the corresponding printing location on work 9.

In more detail, the second deflector is constituted by a first XY table 10, second XY table 20, and a base 30 having a lens 40 that is supported by these tables 10 and 20.

First XY table 10 is a table that is driven in the X direction by a drive motor 11; second XY table 20 is also moved with movement of this first XY table 10. Second XY table 20 is a table that is driven in the Y direction by a drive motor 21; first XY table 10 is also moved in the Y direction with movement of this second XY table 20.

Motors 11, 21 are for example pulse motors; the position P of incidence of the beam on the marking surface of work 9 is moved by a prescribed distance for each pulse.

Thus by driving motors 11 and 21, base 30 that is supported by tables 10 and 20 can be moved to any desired position in the X and Y directions.

As a result, the printing pattern of liquid crystal mask 6 can be marked at any desired position P by directing the laser beam L that has passed through lens 40 in the middle of base 30 onto this position P on the XY plane of work 9.

Subsequently in the same way the printing patterns of the divided images of work 9 are successively applied as marking until finally all the printing patterns of the original image are applied as marking.

In this process, oscillation of laser oscillator 1, drive of first XY deflectors 3X and 3Y, drive of the second XY deflector, and display changeover of the divided patterns on liquid crystal mask 6 etc. are controlled by marker controller 70.

It should be noted that the construction of the laser marking machine is not restricted to the above but could be modified in various ways.

For example, instead of the second XY deflector, a construction could be adopted comprising a combination of a movable mirror and a base movable in one direction, or using two movable mirrors.

First Embodiment

Next, the processing when the original image shown in FIG. 11 is applied as marking will be described with reference to the flowchart shown in FIGS. 2 and 3.

First of all, the original image data (including data of the position where marking is to be effected) compiled by host computer 50 and that is to be printed onto the marking surface of work 9 is transferred to panel controller 60, and then, after it has been received, is stored in memory (steps 101, 102, 103). Panel controller 60 stores code numbers indicating the original image that has been sent from host computer 50. Panel controller 60 converts the original image data that it has received into printing patterns Bi (i=1 to 4) (liquid crystal display data) of each divided image (step 104: see FIG. 11).

For each printing pattern of each divided image Bi (i=1 to 4), it then searches for the distinction: printing portion/non-printing portion (white space portion). Specifically, for each row of the divided image, it determines whether this row is "printing" or "non-printing" and stores the result of the determination as "printing/non-printing information data" (step 105).

Figure 3:
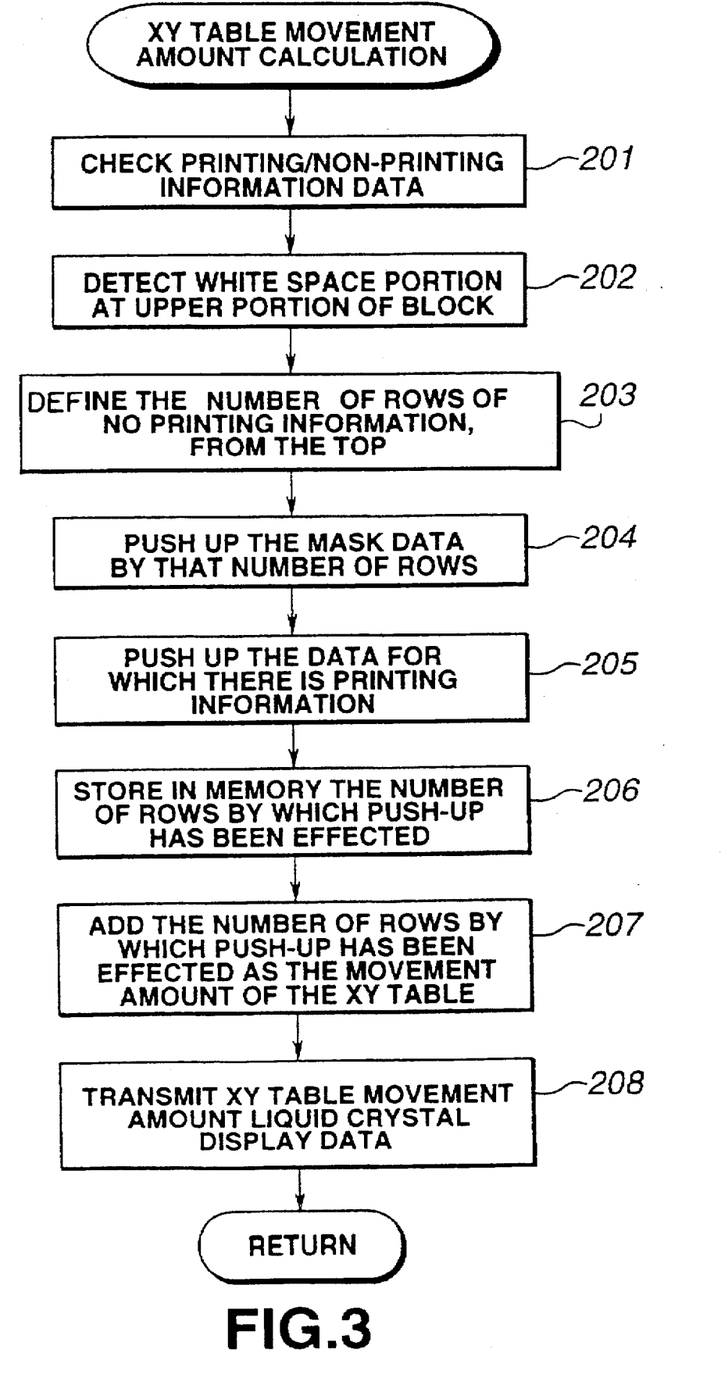
FIG. 3 is a flow chart illustrating a processing procedure according to an embodiment.

Next, the procedure shifts to the "XY movement amount calculation sub-routine" shown in FIG. 3 (step 106).

In this sub-routine, it first of all checks the content of the printing/non-printing information data, to see whether a non-printing portion is present at the uppermost region of the divided image. Taking divided images B2, B3 as examples, it detects whether the portion from the first row of these divided images B2, B3 up to the H-th row is a non-printing portion or not (steps 201, 202: see FIG. 11).

By checking the number of rows in order from the top whose printing information is "non-printing", it establishes that up to the H-th row is non-printing (step 203).

Figure 12B:
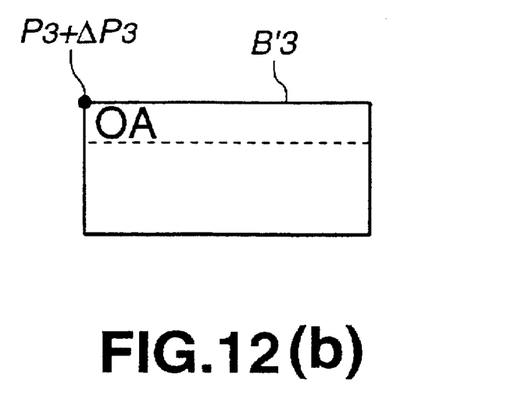

It thereupon performs processing (step 204) to push the printing portions "APPER" and "OA" upwards by this amount i.e. H row, thereby acquiring new divided images B'2, B'3 as shown in FIG. 12(a) and (b) (step 205). It then stores the number of rows H by which this push-up has been effected in memory (step 206).

Next, it finds by calculation a movement amount correction ΔP for XY tables 10, 20 corresponding to the number of rows H by which push-up has been effected, and finds a corrected movement amount P+ΔP by adding this movement correction ΔP to the ordinary movement amount P when movement to the next divided image printing position is effected.

That is, specifically, the movement correction ΔP of XY tables 10, 20 corresponding to the number of rows H by which push-up has been effected is found as a pulse number correction to be applied to motors 11 and 12.

That is:

Pulse number correction ΔP=(DT/PL)·H=PD·H where DT is the size of 1 bit (1 row) on the marking surface of work 9;

PL is the movement distance per pulse on the marking surface;

H is the number of rows (H row) by which push-up has been effected; and

PD is the number of pulses necessary to produce a movement of 1 dot (1 row) (step 207).

The corrected movement amount P+ΔP of XY tables 10, 20 and the liquid crystal display data (printing patterns of divided images Bi) that are thus found are then sent from panel controller 60 to marker controller 70 (step 208). The procedure then returns to step 107 of FIG. 2 and marker controller 70, receiving the above data, executes the marking sequence based on this received data (steps 107, 108).

Next, the details of the marking sequence will be described with reference to the timing chart of FIG. 6. The sequence when printing the printing pattern of divided image B3 after printing the printing pattern of divided image B2 shown in FIG. 11 will now be described.

Specifically, laser oscillator 1 is for example a Q-switched YAG laser which commences continuous oscillation when the oscillation start button of panel controller 60 is pressed. If the Q switch is not operated, the laser stays OFF and no laser beam L0 is directed onto liquid crystal mask 6 (FIG. 6(d)).

As liquid crystal mask 6 there may be employed for example a composite polymer liquid crystal, each pixel (dot) of the liquid crystal being driven by voltage. That is, liquid crystal 6 has the property that light is transmitted by pixel (dot) portions thereof where voltage is applied and is dispersed and so not transmitted by pixel (dot) portions thereof where voltage is not applied. The pixels of liquid crystal 6 may be driven in time-division fashion, for example.

Thereupon, when motors 11 and 21 that drive XY tables 10, 20 are driven to their initial positions by marker controller 70, XY tables 10, 20 are moved to their start positions. Also, the motors that drive scanning mirrors 3X and 3Y are driven to their initial positions causing scanning mirrors 3X and 3Y to be driven to their start positions. As a result, as shown by arrow a, liquid crystal mask 6 is changed from the OFF condition to the ON condition (voltage-applied condition). It should be noted that whilst XY tables 10, 20 and scanning mirrors 3X, 3Y are moving to the starting position, marker controller 70 converts the liquid crystal display data of divided image B'2 into an electrode application signal to be applied to the electrodes of liquid crystal 6 and applies this electrode application signal to liquid crystal mask 6.

When liquid crystal mask 6 is turned ON, as shown by arrow a', a trigger signal is applied to the Q switch of YAG laser oscillator 1, causing pulse oscillation of YAG laser oscillator 1 to be commenced with a pre-set frequency, so that laser beam L0 is directed onto the input face of liquid crystal mask 6.

When laser beam L0 is launched, as shown by arrow b, scanning mirrors 3X, 3Y commence scanning.

As a result, as shown in FIG. 12(a), the printing portion "APPER" (J-th row) of divided image B'2 is scanned and this marking pattern is marked at position P2+ΔP2 of work 9. At the time-point when scanning of the printing portion is completed, liquid crystal mask 6 is turned OFF and the drive of XY tables 10, 20 is turned ON as shown at arrow c, and movement to the next printing position, of divided image B'3, is commenced.

Marker controller 70 then drives XY tables 10, 20 by a corrected amount P3+ΔP3 obtained by adding movement amount correction ΔP3 to the movement amount P3 from the ordinary printing position of divided image B2 to the printing position of divided image B3.

Consequently, the printing pattern of the next divided image B'3 will be printed in the corrected position P3+ΔP3 (FIG. 12(b)); thus the effect is the same as printing the original divided image B3 shown in FIG. 11 at the regular position P3.

In this process, movement of XY tables 10, 20 to the next divided image B'3 is commenced during the scanning of the previous divided image B'2 by scanning mirrors 3X, 3Y and practically all of the movement of tables 10, 20 is performed during the scanning. Consequently, no further movement of XY tables 10, 20 is required after completion of scanning of one screen; the waiting time of table movement is thereby shortened and the efficiency of the operation is raised.

Furthermore, since laser beam scanning is still performed in respect of the non-printing portion even after scanning of the printing portion of divided image B'2 has been completed, the entire surface of liquid crystal mask 6 is subjected to uniform laser beam irradiation. Consequently an intra-surface temperature distribution of liquid crystal mask 6 is not generated and marking irregularities can be suppressed.

When ultimately the scanning of the entire surface of liquid crystal mask 6 is completed by scanning mirrors 3X, 3Y, as shown by arrow d, the Q switch is turned OFF and laser irradiation of liquid crystal mask 6 from laser oscillator 1 is turned OFF.

Second Embodiment

Figure 9:
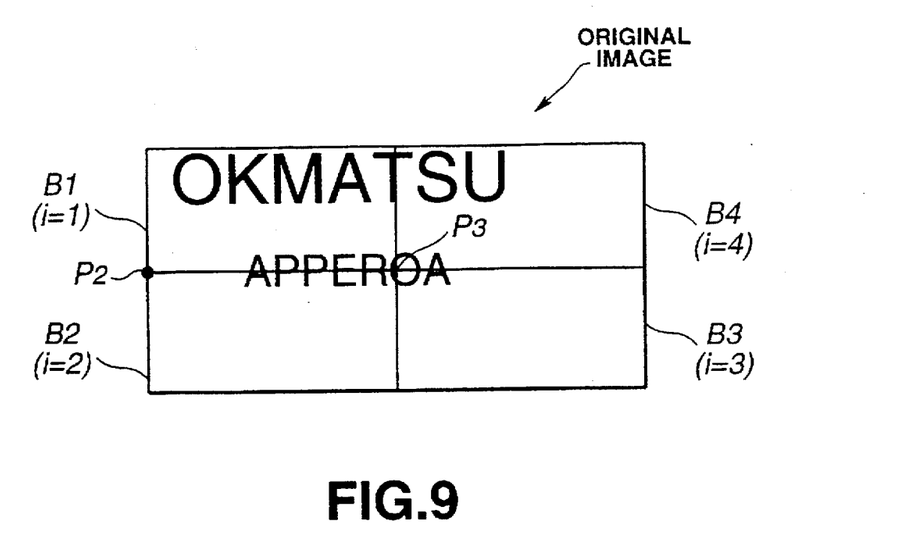
FIG. 9 is a view showing the original image of a marking pattern of an embodiment.

Next, the processing when the original image shown in FIG. 9 is applied as marking will be described.

Although, in the case of the divided images B1 and B4 shown in FIG. 9, there are no non-printing portions either in the upper region or the lower region of the screen, in the case of the divided images B2 and B3, there is a non-printing portion in the lower region of the screen, so, just as in the first embodiment described above, processing may be performed so as to drive XY tables 10, 20 to the printing position of the next divided image immediately after completion of scanning of the printing portion.

Figure 6A:
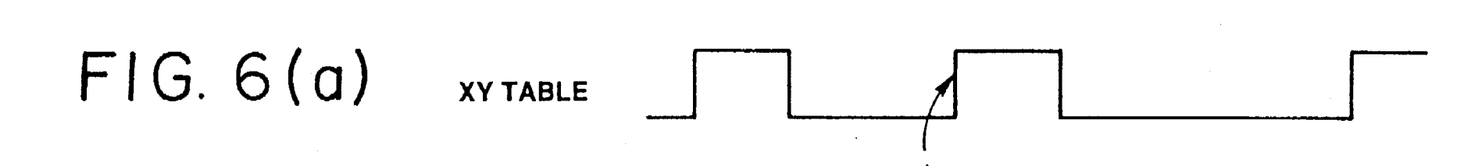
Figure 6B:
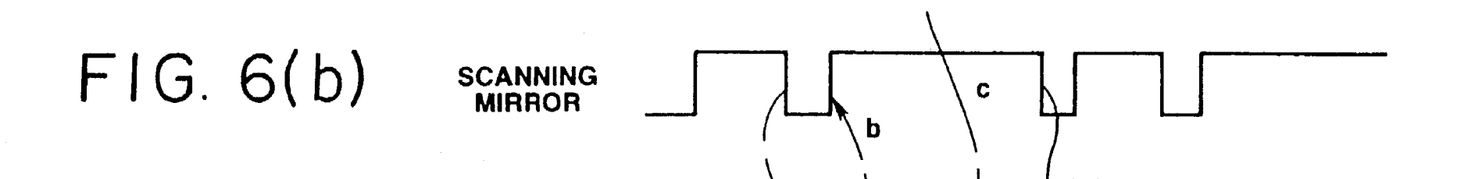
Figures 6C, 6D:
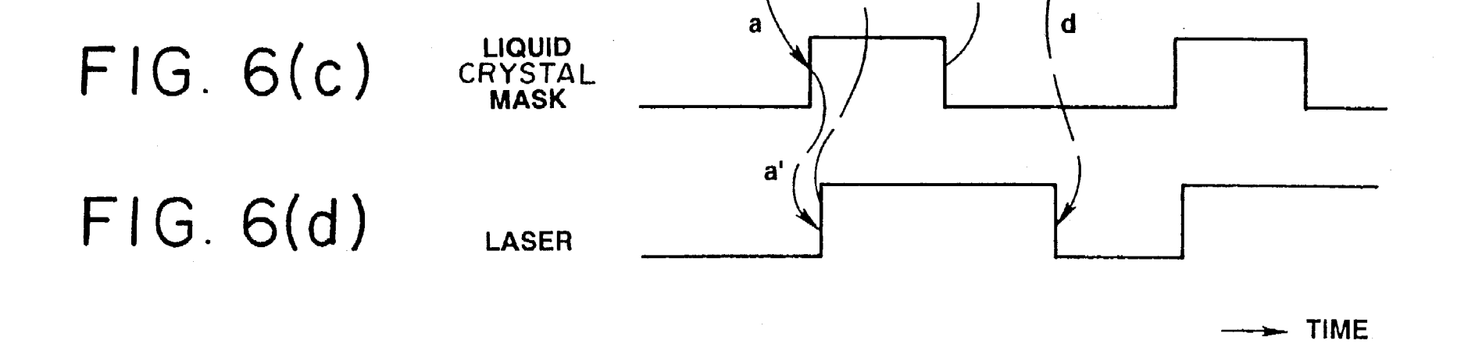

Specifically, just as in the marking sequence shown in FIG. 6, the printing portion APPERO of divided image B2 shown in FIG. 9 is scanned and at the time-point when scanning of this printing portion has been completed, liquid crystal mask 6 is turned OFF and, as shown at arrow c, movement by XY tables 10, 20 may be commenced.

In this case, in contrast to the first embodiment, it is not necessary to perform "push-up" processing on the printing portions in respect of divided images B2, B3. Consequently, marker controller 70 does not need to add an XY table movement amount ΔP3 corresponding to the amount of push-up to the movement amount P3 from the ordinary printing position of divided image B2 to the printing position of divided image B3 and the printing pattern of the next divided image B3 is printed at the normal position P3 simply by driving XY tables 10, 20 by the ordinary movement amount P3.

Also, just as in the first embodiment, XY tables 10, 20 commence movement to the next divided image B3 during the scanning (from the time-point where the scanning of the printing portion is completed) of the preceding divided image B2 by scanning mirrors 3X, 3Y, and practically all of the movement of the scanning tables is effected during scanning. Consequently, no further movement of the XY tables is required after completion of scanning of one screen; the waiting time of the movement tables is thereby shortened and the efficiency of the operation is raised.

Furthermore, just as in the first embodiment, since laser beam scanning is still performed in respect of the non-printing portion even after scanning of the printing portion has been completed, the entire surface of liquid crystal mask 6 is subjected to uniform laser beam irradiation. Consequently an intra-surface temperature distribution of liquid crystal mask 6 is not generated and marking irregularities can be suppressed.

Third Embodiment

Next, the processing in the case where an original image consisting of the two divided images B1 and B2 shown in FIG. 10(a) is used for marking will be described with reference to the flowcharts shown in FIG. 4 and FIG. 5 and the timing charts shown in FIG. 7 and 8.

Figure 2:
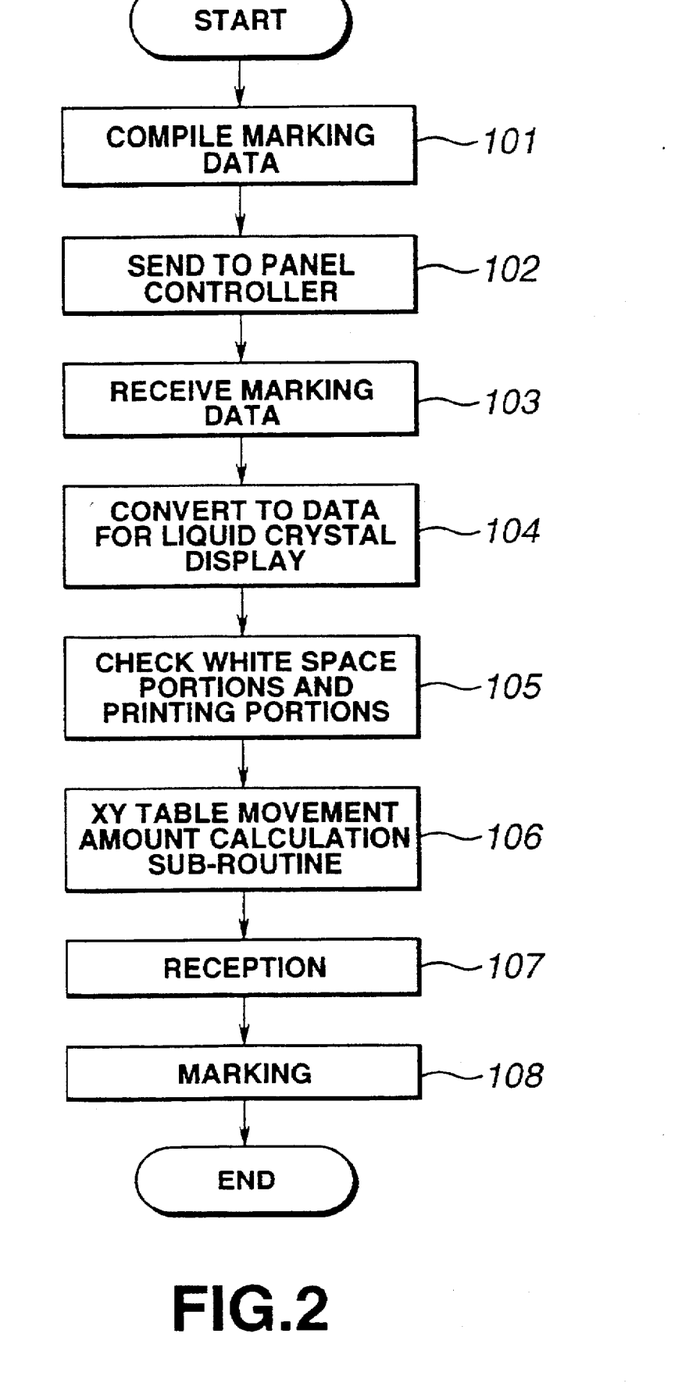
FIG. 2 is a flow chart illustrating a processing procedure according to an embodiment.
Figure 4:
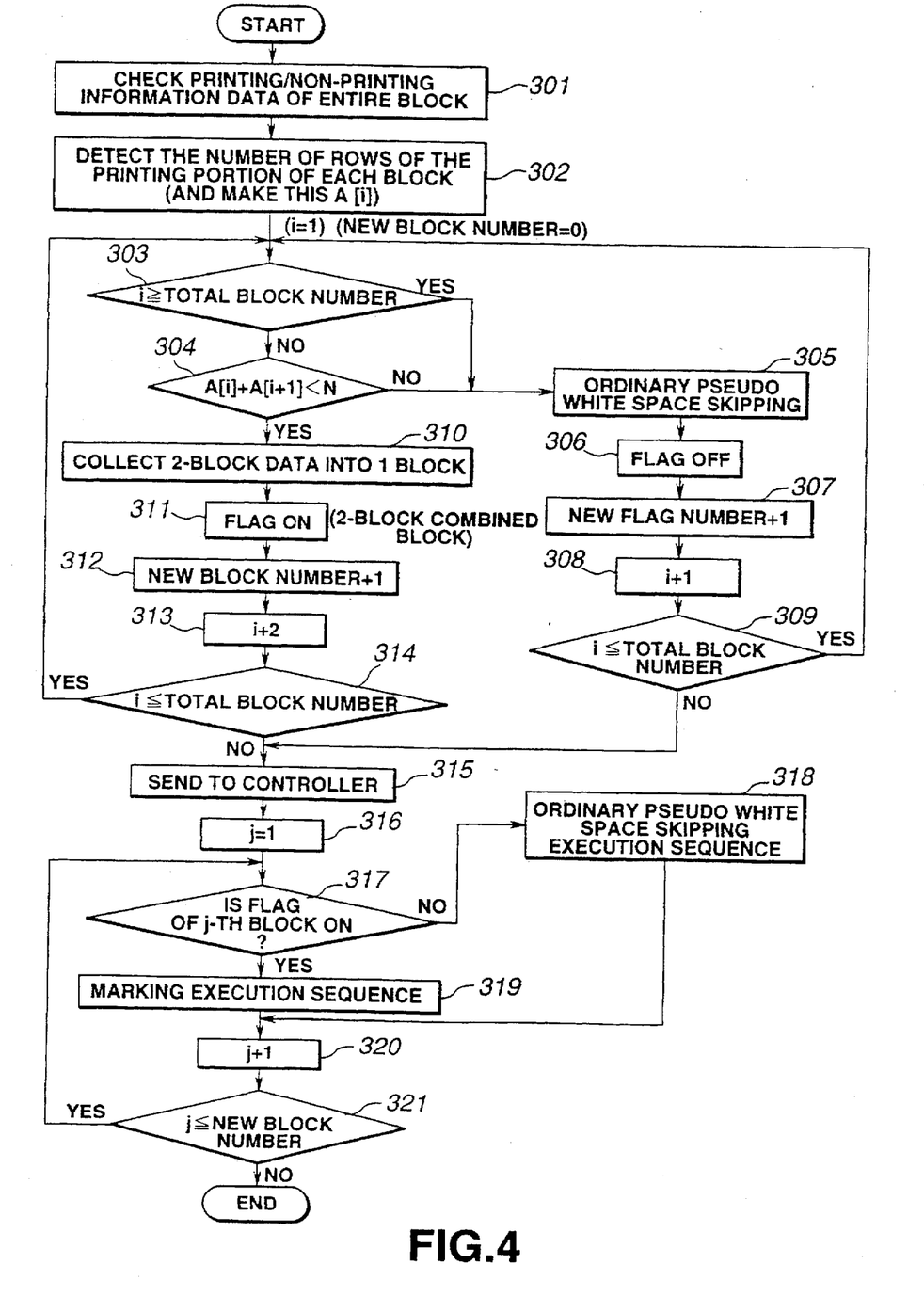
FIG. 4 is a flow chart illustrating a processing procedure according to an embodiment.

It should be noted that, as pre-processing of FIG. 4, the processing shown in steps 101 to 105 of FIG. 2 is performed but description of this will not be repeated.

Hereinbelow for convenience a divided image will be called a "block" and a block obtained by combining one block with another one block will be regarded as a single block and the number of newly set up blocks will be called the "number of new blocks".

Specifically, as shown in FIG. 4, the printing/non-printing data for each row of all blocks B1, B2 is checked (step 301) and the number of rows A[i] in each divided image Bi is detected.

As shown in FIG. 10(a), we have: divided image B1: A[1]=D row ("APPEROA") divided image B2: A[2]=E row ("OKMATSU") (step 302).

Thereupon, i is initialized to 1 and the new block number is initialized to 0, and it is determined whether or not i is equal to or greater than the total block number (two blocks). That is, it is determined whether the number of blocks still to be processed is one block or is two or more blocks (step 303).

Since now i=1, the result of this determination is NO, so the procedure goes to step 304. However, if i=3, the determination result is YES and the procedure goes to step 305.

In step 304, a determination is made as to whether the total number A[i]+A[i+1] of rows of a printing portion constituting a continuous block is or is not smaller than a prescribed threshold value N. Threshold value N is a threshold value for determining whether or not the printing portions of two blocks Bi, Bi+1 can be accommodated in a single block B. Specifically, it may be given by for example N=(number of rows of liquid crystal)−(interval C row necessary for accommodating two blocks in one block) where C row is a pre-set value that is input beforehand from outside.

Accordingly, if the decision is NO in step 304, it is decided that combination into a signal block B cannot be achieved and the procedure goes to step 305.

In this case, a decision is made (step 305) to execute, in respect of block B1, "ordinary pseudo white space skipping" processing i.e. processing as described in the first to second embodiments above, and a flag is turned OFF.

This flag is a flag which is set at each block; if the flag is ON, this means that the block in question is a combination of two blocks and that the marking sequence is to be executed for the combined block as will be described. On the other hand, if the flag is OFF, this indicates that the block in question was not obtained as a result of combination but is an original unmodified divided image; the marking sequence "ordinary pseudo white space skipping" (FIG. 6) is therefore to be executed (step 306).

Next, the new block number is incremented by +1 (step 307). That is, it is to be assumed that the flag of block B1 i.e. the block whose new block number is "1" is OFF. Next, i is incremented by +1 (step 308) and a determination is made as to whether i is less than or equal to the total block number (2) or not (step 309). Since in this case i=2, the decision is YES and the procedure returns to step 303. If i=3, the decision would be NO and the procedure would go to step 315.

However, if the decision of step 304 is YES, it is assumed that the block in question is the result of combining two blocks into one; the procedure goes to step 310 and the block combination sub-routine whereby the data of two blocks are combined into 1-block data is executed.

Figure 5:
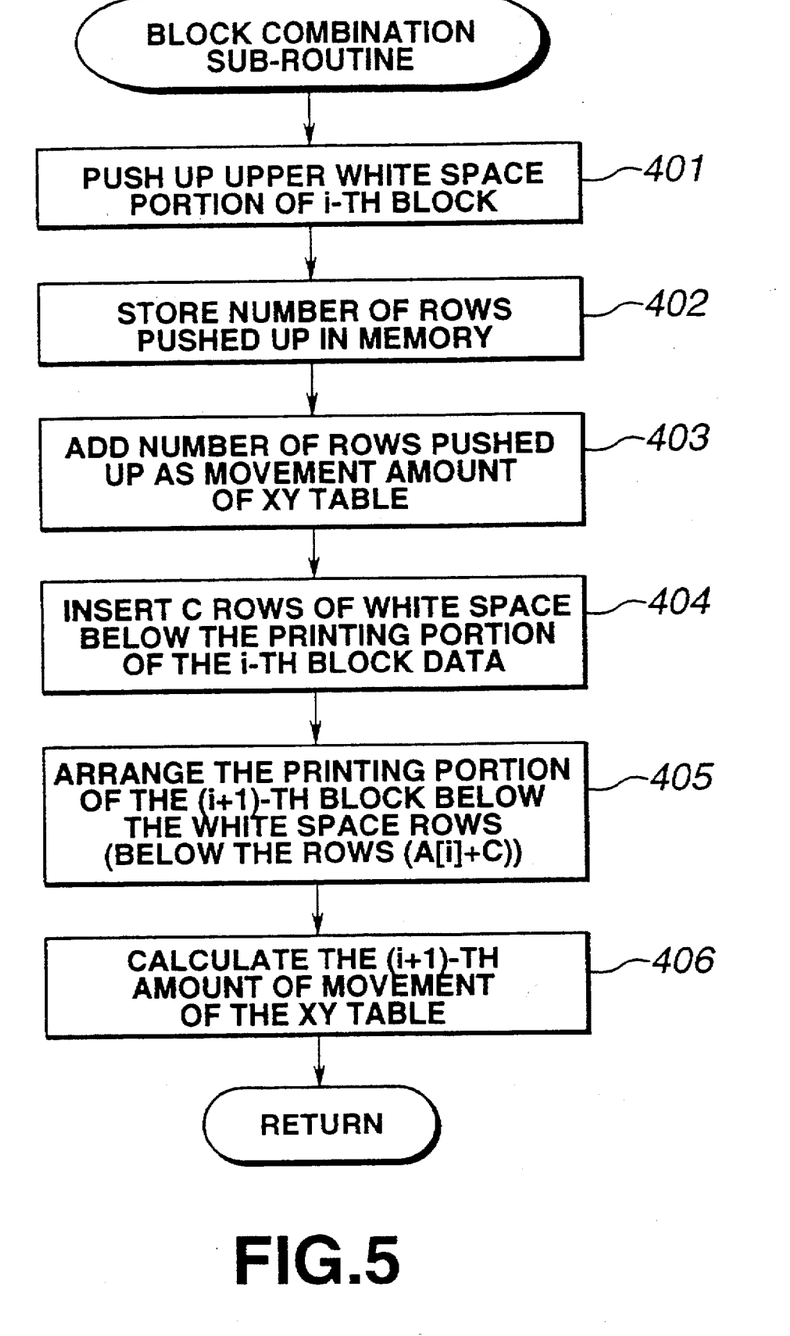
FIG. 5 is a flow chart illustrating a processing procedure according to an embodiment.

Specifically, as shown in FIG. 5, first of all, processing is executed to push the i-th block i.e. the non-printing portion at the top of divided image B1 upwards (step 401).

At this point, the number of rows K by which push-up was effected is stored in memory (step 402: see FIG. 10(a)).

Next, processing to find a corrected movement amount P1+ΔP1 of block B1 by adding to ordinary movement P1 of XY tables 10, 20 a movement amount correction ΔP1 corresponding to the number of rows K of push-up is performed just as in step 207 described above (step 403: see FIG. 10(b)).

Processing is then executed to insert a non-printing portion of C row below the printing portion "APPEROA" of i-th block B1 (step 404: see FIG. 10(b)).

The i+1-th block i.e. the printing portion "OKMATSU" of divided image B2 is then arranged below this non-printing portion of C row (step 405: see FIG. 10(b)).

Then, when the marking of the printing portion "APPEROA" of i-th block B1 has been completed, calculation of movement amount P2+ΔP2 of XY tables 10, 20 up to the printing start position of the printing "OKMATSU" of the i+1-th block B2 is performed as follows.

For this purpose, the movement amount correction ΔP2 of XY tables 10, 20 is found by calculation and this movement amount correction ΔP2 is added to the ordinary movement amount P2 (see FIG. 10(a)) associated with movement of the printing position of the next divided image B2.

Specifically, the movement amount correction ΔP2 of XY tables 10, 20 is found as a correction of the number of pulses to be supplied to motors 11 and 21. The correction ΔP2 of the number of pulses to be supplied to motors 11 and 21 of XY tables 10, 20 is as follows:

Pulse number correction ΔP2=PD·[G−(D+C)]

where PD is the number of pulses required for movement of one dot (one row);

G is the number of non-printing rows of the region above the (i+1)-th block B2;

D is the number of printing rows of i-th block B1[1]

C is the number of non-printing rows between the two blocks.

Thus the corrected pulse number i.e. the corrected movement amount P2+ΔP2 is calculated (step 406: see FIG. 10(a), (b)).

Thus, when the block combination routine is finished, the procedure returns to step 311 and the flag is turned ON (step 311).

The new block number is then incremented by +1. As a result, the number of the combined block B is made 1 (there are no remaining blocks) and the combined-block marking sequence (to be described) is performed on this block B (step 312).

i is then incremented by +2 (step 313) and a determination is performed as to whether i is equal to or less than the total number of blocks (2) or not (step 314). i=3 so the result of this decision is NO, and the procedure goes to the next step 315. If the total number of blocks were more than 3, the result of the decision would have been NO, and the procedure would have returned to step 303.

Next, the movement amount P1 of XY tables 10, 20 relating to combined block B, movement amount correction P2+ΔP2 and the liquid crystal display data of combined block B are sent to marker controller 70 (step 315).

Controller 70 initializes j (step 316) and determines whether or not the flag of the j-th new block is ON (step 317). Since the flag of new block number 1 has become ON, the procedure goes to the next step 319 and executes the combined-block marking sequence shown in FIG. 7 in respect of combined block B. However, as seen in steps 305, 306 and 307, if the new block of number 1 were an unmodified original block B1 so that the flag was OFF, the result of the decision process of step 317 would be NO, causing the procedure to go to step 318 and the ordinary pseudo white space skipping marking execution sequence (FIG. 6) to be performed.

Next, the combined-block marking sequence shown in FIG. 7 will be described.

That is, scanning mirrors 3X, 3Y are moved to the start positions by marker controller 70 and XY tables 10, 20 are moved to the start position. When this happens, as shown by arrow a, liquid crystal mask 6 changes from the OFF condition to the ON condition (voltage-applied condition).

It should be noted that, during the time whilst XY tables 10, 20 and scanning mirrors 3X, 3Y are moving to the start position, marker controller 70 is converting the liquid crystal display data of combined image B shown in FIG. 10(b) to an electrode application signal to be applied to the electrodes of liquid crystal 6 and is applying this electrode application signal to liquid crystal mask 6.

When liquid crystal mask 6 is turned ON, as shown at arrow a', a trigger signal is applied to the Q switch of YAG laser oscillator 1 causing pulse oscillation of YAG laser oscillator 1 to start at a pre-set frequency with the result that laser beam LO is directed onto the input face of liquid crystal mask 6.

Scanning by scanning mirrors 3X, 3Y is then commenced as shown at arrow b.

Figure 7A:
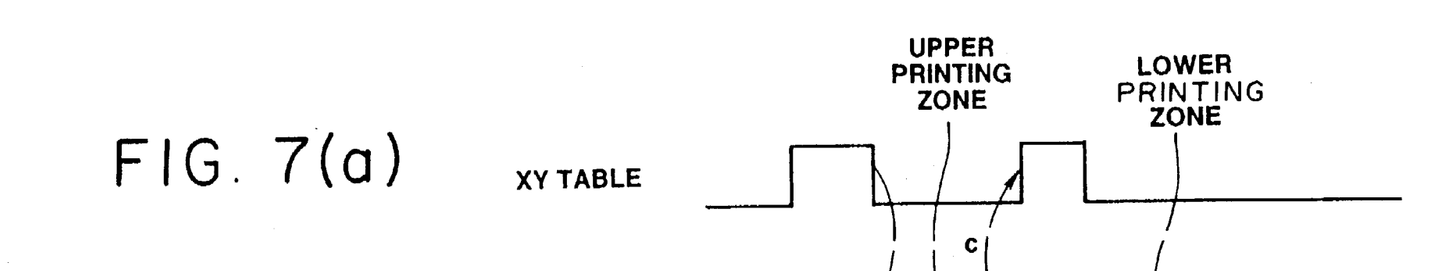
Figure 7B:
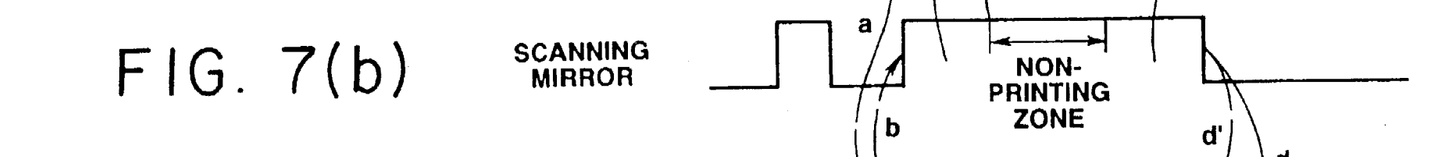
Figure 7C:
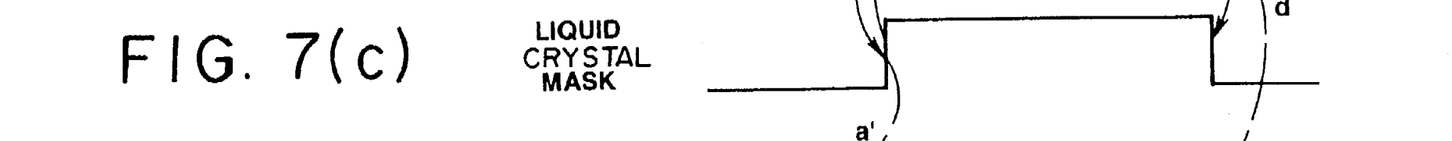
Figure 7D:
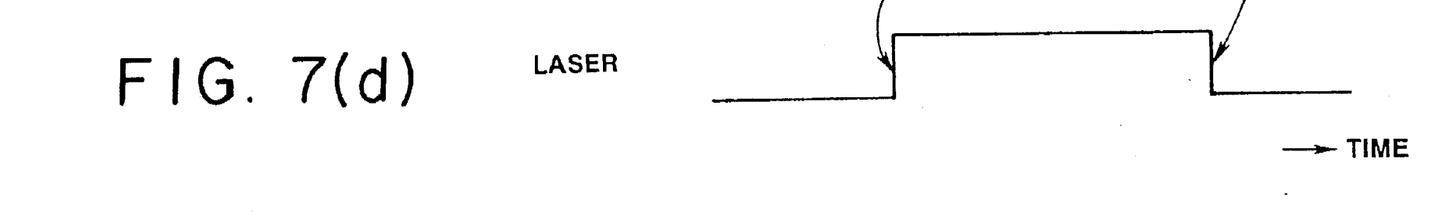
Figure 8A:
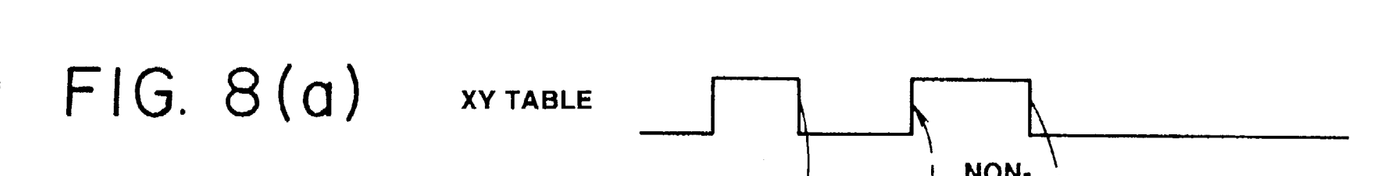
Figure 8B:
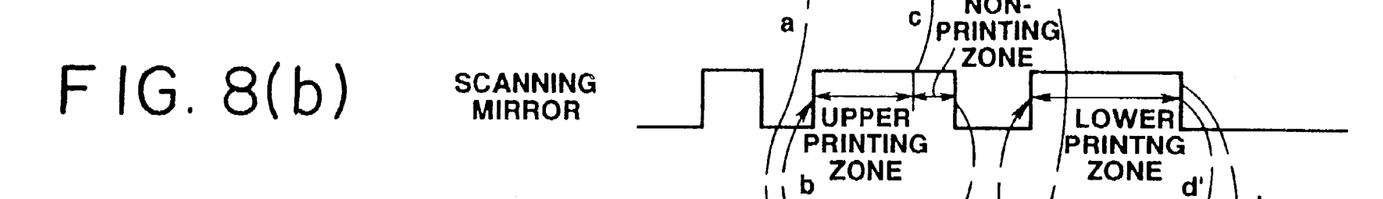
Figure 8C:
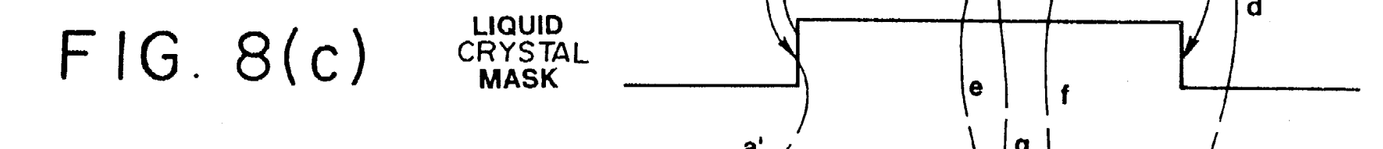
Figure 8D:
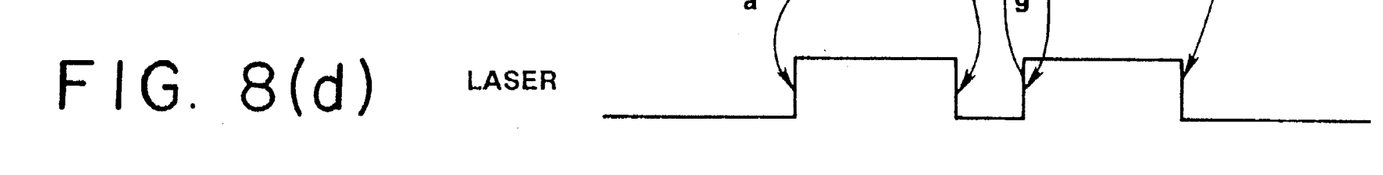

As a result, scanning of the printing portion "APPEROA" (line D) of combined image B shown in FIG. 10(b) is performed in the upper printing zone (see FIG. 7(b)).

Thereupon, XY tables 10, 20 are driven by the amount of the corrected movement amount P1+ΔP1 calculated as above. The first printing portion "APPEROA" is therefore printed at corrected position P1+ΔP1 (FIG. 10(b)); thus the result is the same as printing the original divided image B1 shown in FIG. 10(a) at the normal position P1.

At the time-point when the scanning in this upper printing zone has been completed, movement to the next marking position is commenced by XY tables 10, 20 as shown at arrow c.

Specifically, marker controller 70 drives XY tables 10, 20 by the amount of the corrected movement amount P2+ΔP2 calculated as above. Thus the next printing portion, i.e. "OKMATSU" is printed at the corrected position P2+ΔP2 (FIG. 10(b)); thus the result is the same as the printing of the original divided image B2 shown in FIG. 10(a) at the normal position P2.

XY tables 10, 20 complete their movement to the next printing portion "OKMATSU" during the scanning of the non-printing zone (see FIG. 7(b)) of C row by scanning mirrors 3X, 3Y. Consequently, no further movement of XY tables 10, 20 is required after completion of scanning of one screen; the waiting time of table movement is thereby shortened and the efficiency of the operation is raised.

When in due course the scanning of the non-printing zone is completed, scanning of the printing portion "OKMATSU" (E row) of combined image B shown in FIG. 10(b) is performed in the lower printing zone (see FIG. 7(b)).

When marking has thus been performed in respect of all the printing, as shown at the arrow d', liquid crystal mask 6 is turned OFF and, as shown at the arrow d, the Q switch is turned OFF, thereby turning OFF laser irradiation of liquid crystal mask 6 from laser oscillator 1.

Thus, in this embodiment, marking time can be shortened by shortening the scanning time of intervening non-printing portions. Furthermore, since the laser beam is applied evenly over the entire surface of liquid crystal mask 6, no temperature distribution within the surface of liquid crystal mask 6 is created and marking irregularities thus can be suppressed.

Next, a different marking sequence to that of FIG. 7 will be described with reference to FIG. 8.

The difference from the processing of FIG. 7 is that, if the movement of XY tables 10, 20 is still not finished at the time-point where scanning of C row of the non-printing zone is completed, scanning mirrors 3X, 3Y are temporarily turned OFF, and laser beam irradiation of liquid crystal mask 6 from laser oscillator 1 is turned OFF as shown at arrow e.

Thus, at the time-point where movement to the next printing position P2+ΔP2 by XY tables 10, 20 has been completed, laser beam irradiation of liquid crystal mask 6 is turned ON as shown at arrows f, g and scanning by scanning mirrors 3X, 3Y is commenced (start of scanning of lower printing zone).

Subsequently, at the time-point when the marking of the lower printing portion "OKMATSU" is completed, liquid crystal mask 6 is turned OFF and laser irradiation of liquid crystal mask 6 is turned OFF.

As described above, with the present invention, in a laser marking machine, shortening of the marking time and suppression of occurrence of marking irregularities can be achieved at the same time.

We claim:

1. A controller of a laser marking machine using a liquid crystal display screen, comprising: display means for dividing a printing pattern of an original image to be printed onto an article into divided-image printing patterns and displaying the divided-image printing patterns on the liquid crystal display screen; scanning means for effecting scanning of a laser beam generated by a laser light source over the liquid crystal display screen; moving means for moving a printing position in such a manner that the printing pattern of the divided image displayed on the liquid crystal display screen is printed at a position on the article corresponding to the divided image in question; and control means for controlling the display means, the scanning means and the moving means, wherein the control means effects controls so that:

the display means displays the printing pattern of the divided image on the liquid crystal display screen such that the divided image is classified into a non-printing region and a printing region, and, if the non-printing region is in an upper region of the divided image, a printing region following the non-printing region is positioned at the upper region;

the moving means corrects a movement amount of the printing position of the printing pattern by the amount of the non-printing region;

the scanning means commences scanning of the printing region of the divided image;

the moving means starts movement to a marking position of a next divided image at a time-point where scanning of the printing region of the divided image has been completed: and the scanning means continues scanning of the non-printing region following the printing region for which the scanning has been completed and commences scanning of the next divided image from a time-point where movement to the marking position of the next divided image has been completed.

2. A controller of a laser marking machine using a liquid crystal display screen, comprising: display means for dividing a printing pattern of an original image to be printed onto an article into divided-image printing patterns and displaying the divided-image printing patterns on the liquid crystal display screen; scanning means for effecting scanning of a laser beam generated by a laser light source over the liquid crystal display screen; moving means for moving a printing position in such a manner that the printing pattern of the divided image displayed on the liquid crystal display screen is printed at a position on the article corresponding to the divided image in question; and control means for controlling the display means, the scanning means and the moving means, wherein the control means effects controls so that:

the moving means classifies the divided image into a non-printing region and a printing region;

in case a non-printing region is in a lower region of the divided image, the scanning means commences scanning of the printing region of the divided image;

the moving means commences movement to a marking position of a next divided image at a time-point when scanning of the printing region of the divided image in question has been completed;

while the scanning means continues scanning of the non-printing region following the printing region for which scanning has been completed and commences scanning of the next divided image from a time-point where movement to the marking position of the next divided image has been completed.

3. A controller of a laser marking machine using a liquid crystal display screen, comprising: display means for dividing a printing pattern of an original image to be printed onto an article into divided-image printing patterns and displaying the divided-image printing patterns on the liquid crystal display screen; scanning means for effecting scanning of a laser beam generated by a laser light source over the liquid crystal display screen; moving means for moving a printing position in such a manner that the printing pattern of the divided image displayed on the liquid crystal display screen is printed at a position on the article to be printed corresponding to the divided image in question; and control means for controlling the display means, the scanning means and the moving means, wherein the control means effects controls so that:

the display means determines whether a size obtained by summing printing regions of a first divided image and a second divided image to be printed continuously is a size that can be contained within the liquid crystal display screen and, if such a determination is made, displays on the liquid crystal display screen a printing pattern obtained by combining the printing pattern of the first divided image and the printing pattern of the second divided image by compressing a non-printing region at a lower side of the printing region of the first divided image and the non-printing region at an upper side of the printing region of the second divided image to a prescribed size; and the moving means commences movement to a marking position of the second divided image from a time-point where scanning of the printing region of the first divided image is completed and corrects a movement amount of the printing position of the printing pattern of the second divided image in accordance with an amount of a prescribed size compression of the non-printing region of the first and second divided images.

* * * * *